US008508196B2

(12) United States Patent
Deguchi

(10) Patent No.: US 8,508,196 B2
(45) Date of Patent: Aug. 13, 2013

(54) SWITCHING REGULATOR

(75) Inventor: Michiyasu Deguchi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 295 days.

(21) Appl. No.: 13/011,371

(22) Filed: Jan. 21, 2011

(65) Prior Publication Data

US 2011/0181262 A1 Jul. 28, 2011

(30) Foreign Application Priority Data

Jan. 25, 2010 (JP) ................................ 2010-013612

(51) Int. Cl.
*G05F 1/00* (2006.01)

(52) U.S. Cl.
USPC .............. 323/242; 323/238; 323/284; 363/49

(58) Field of Classification Search
USPC ................ 323/238, 242, 243, 285, 288, 901, 323/282, 284; 363/49
See application file for complete search history.

(56) References Cited

U.S. PATENT DOCUMENTS

| | | | | |
|---|---|---|---|---|
| 5,514,947 | A * | 5/1996 | Berg | 323/282 |
| 6,954,056 | B2 * | 10/2005 | Hoshino et al. | 323/285 |
| 7,579,784 | B2 * | 8/2009 | Araki et al. | 315/209 R |
| 2004/0046534 | A1 * | 1/2004 | Michael Johnson et al. | 323/280 |
| 2009/0135632 | A1 * | 5/2009 | Sohma | 363/89 |

* cited by examiner

*Primary Examiner* — Nguyen Tran
(74) *Attorney, Agent, or Firm* — Brinks Hofer Gilson & Lione

(57) ABSTRACT

Provided is a switching regulator capable of performing stable start-up with a soft-start operation without causing excessive extension of a soft-start time period. In a start-up period, a voltage approximating a feedback voltage (FB) is provided as an initial value of a soft-start reference voltage. The feedback voltage (FB) and the soft-start reference voltage become substantially equal to each other at a moment when the start-up is completed, to thereby realize a smooth transition of an operating state from the start-up to normal control.

7 Claims, 4 Drawing Sheets

SWITCHING REGULATOR

RELATED APPLICATIONS

This application claims priority under 35 U.S.C. §119 to Japanese Patent Application No. 2010-013612 filed on Jan. 25, 2010, the entire content of which is hereby incorporated by reference.

BACKGROUND OF THE INVENTION

1. Field of the Invention

The present invention relates to a switching regulator, and more specifically, to a soft-start function of a switching regulator.

2. Description of the Related Art

In recent years, battery-driven devices such as portable phones, portable music players, digital cameras, and personal digital assistants (PDAs) have become increasingly widespread. Many of the devices use dry cells as power supply in view of cost or the easiness of securing power supply outside the house. Further, considering a reduction in running cost or growing environmental awareness, some of the devices are required to operate with a single dry cell. In general, the dry cell has a cut-off voltage of about 0.9 V, and hence a switching regulator is used to boost a voltage ranging from approximately 0.9 V to 1.5 V to a voltage of 3 V or 5 V, which is then supplied to the device as power therefor.

However, stable operation of the switching regulator is very difficult to achieve with a voltage as low as 0.9 V to 1.5 V. For that reason, there is employed a technology in which the switching regulator performs a boosting operation with a pulse (several tens of KHz to several hundreds of KHz) supplied from a square-wave oscillator so as to output a relatively high voltage (1.5 V to 2.0 V) and the boosted voltage is then used as power supply to the switching regulator.

FIG. 4 is a circuit diagram illustrating a conventional switching regulator.

The conventional switching regulator includes a switching regulator control circuit 1 and peripheral circuits. A DC voltage source 34 is a power source of the switching regulator control circuit 1 and has a voltage range of from 0.9 V to 1.5 V, assuming a single dry cell as the DC voltage source 34. A square-wave oscillator 18 is an oscillation circuit for outputting a square-wave pulse clk. A voltage of an output terminal VOUT also serves as a power supply voltage to the switching regulator control circuit 1. A voltage detection circuit 17 monitors the voltage of the output terminal VOUT. If the voltage of the output terminal VOUT is lower than a threshold voltage VTH, a detection signal Vpg of the voltage detection circuit 17 is L. When the detection signal Vpg of the voltage detection circuit 17 is L, the square-wave oscillator 18 is in an operating state. A multiplexer circuit 19 outputs the square-wave pulse clk when the detection signal Vpg of the voltage detection circuit 17 is L, and outputs a signal Vpwm of a PWM comparator 16 when the detection signal Vpg of the voltage detection circuit 17 is H. A buffer circuit 20 drives a power transistor 30.

Before the switching regulator control circuit 1 starts a boosting operation, the output terminal VOUT has a voltage determined by subtracting a forward voltage Vf of a diode 32 from a voltage VIN of the DC voltage source 34. The threshold voltage VTH is set to 1.5 V in this example. In other words, if the voltage VIN is 1.5 V or lower, the output voltage of the output terminal VOUT is 1.5 V or lower, and hence the detection signal Vpg of the voltage detection circuit 17 is L. Accordingly, the multiplexer circuit 19 outputs the square-wave pulse clk of the square-wave oscillator 18. The power transistor 30 is driven by the square-wave pulse clk, and the switching regulator starts the boosting operation. This period is referred to as a start-up period T1.

In the start-up period T1, the detection signal Vpg is L and fixes an output VREF_SS of a soft-start circuit 12 to 0 V, and hence the switching regulator control circuit 1 performs the boosting operation with the square-wave pulse clk without negative feedback control.

Through the boosting operation with the square-wave pulse clk, when the output voltage of the output terminal VOUT exceeds the threshold voltage VTH, the detection signal Vpg of the voltage detection circuit 17 becomes H and the square-wave oscillator 18 suspends its operation. The multiplexer circuit 19 outputs the signal Vpwm of the PWM comparator 16.

When the detection signal Vpg of the voltage detection circuit 17 becomes H, the soft-start circuit 12 starts its operation, entering a soft-start period T2.

FIG. 5 is a circuit diagram illustrating an example of the conventional soft-start circuit 12.

The soft-start circuit 12 operates as follows to output the soft-start reference voltage VREF_SS. A constant current source 113 charges a capacitor 107 to gradually increase a voltage of the capacitor 107. The voltage of the capacitor 107 controls a gate of an N type MOS transistor 105. Accordingly, a reference voltage VREF, which is output from a reference voltage source 13, is output as the gradually-increasing soft-start reference voltage VREF_SS from the N type MOS transistor 105.

Referring to the drawings, a problem inherent in the switching regulator having the above-mentioned configuration is described. FIG. 6 is a graph illustrating an operation of the switching regulator of FIG. 4.

Upon a change from the start-up period T1 to the soft-start period T2, the square-wave oscillator 18 suspends its operation while the soft-start circuit 12 starts its operation. The voltage of the output terminal VOUT has been boosted in the start-up period T1, and hence a feedback voltage FB takes a value corresponding thereto. As can be seen from FIG. 6, however, the reference voltage VREF_SS increases gradually from 0 V. On this occasion, an operational amplifier 14 outputs a voltage Verrout to the PWM comparator 16 so as to maintain an equal magnitude relationship between the feedback voltage FB and the reference voltage VREF_SS. Because the feedback voltage FB is higher than the reference voltage VREF_SS, the voltage Verrout output from the operational amplifier 14 is higher than a voltage waveform of a ramp pulse Vramp of a ramp-wave oscillator 15. Therefore, the PWM comparator 16 does not output a switching pulse and hence the switching regulator does not perform the boosting operation. Accordingly, the output voltage of the output terminal VOUT gradually decreases because of the discharge of a load or the like (period TA). The voltage detection circuit 17 has hysteresis in detection voltage and is designed not to clear a detected state even when the voltage of the output terminal VOUT decreases to some extent. However, if a large load is connected, the voltage of the output terminal VOUT decreases beyond the hysteresis, with the result that the voltage detection circuit 17 may clear the detected state. In this case, the operating mode returns to the start-up period T1 again, in which the boosting operation with the square-wave pulse clk is started. If no change occurs in the load, the start-up period T1 and the period TA are repeated.

In order to solve the above-mentioned problem, there is disclosed a switching regulator having a circuit configuration illustrated in FIG. 7 (see Japanese Patent Application Laidopen No. 2004-166428). The square-wave oscillator 18 is controlled by a comparator 21. The comparator 21 has an inverting input terminal to which the feedback voltage FB is input and a non-inverting input terminal to which a soft-start slope voltage V_SS is input. When the feedback voltage FB is lower than the soft-start slope voltage V_SS, the comparator 21 outputs H to allow the square-wave oscillator 18 to operate. A capacitor Css starts to be charged by a constant current source 22 simultaneously with the start-up. Therefore, the slope voltage V_SS increases simultaneously with the start-up. An operational amplifier 14 has two inverting input terminals, and a reference voltage Vref is input to one of those terminals and the slope voltage V_SS is input to another terminal. Those two inverting input terminals are designed such that only one of the terminals to which a lower voltage is input is enabled. Specifically, the slope voltage V_SS is available until the slope voltage V_SS continues increasing to reach to the reference voltage Vref. Then, when the slope voltage V_SS exceeds the reference voltage Vref, the reference voltage Vref becomes available.

Upon the start-up of the switching regulator, the slope voltage V_SS increases gradually. When the slope voltage V_SS exceeds the feedback voltage FB, the square-wave oscillator 18 starts its operation. Then, the switching regulator performs a boosting operation with the square-wave pulse clk. On the other hand, when the slope voltage V_SS becomes lower than the feedback voltage FB, the square-wave oscillator 18 suspends its operation. In other words, a kind of frequency modulation control is performed so that the voltage of the output terminal VOUT increases following the rise of the slope voltage V_SS.

Therefore, when the voltage of the output terminal VOUT exceeds the threshold voltage VTH and the detection signal Vpg of the voltage detection circuit 17 becomes H, the feedback voltage FB and the slope voltage V_SS are close to each other, with the result that a smooth transition from the start-up to normal control is realized without a time lag corresponding to the period TA as illustrated in FIG. 6.

In the switching regulator of FIG. 7, however, the constant current source 22 charges the capacitor Css to generate the slope voltage V_SS, which makes it very difficult to control the slope voltage V_SS with a low power supply voltage. If the power supply voltage supplied to the constant current source 22 falls below 1 V, it is difficult to maintain constant current characteristics thereof, resulting in a significantly reduced charge current for the capacitor Css. The reduction ratio is possibly 1/10 to 1/100 or more as compared to a situation in which the output voltage of the output terminal VOUT is high and a stable operation of the soft-start circuit 12 is ensured. In this case, the slope of the rise of the slope voltage V_SS becomes gentle in proportion to a current reduction rate, and it takes 10 to 100 times more time to generate the slope voltage V_SS. In other words, the switching regulator requires a significantly long start-up time period, which poses a problem that a device equipped with the switching regulator takes a long time from when a power switch is turned on until the device is enabled for actual use.

SUMMARY OF THE INVENTION

The present invention has been made to solve the above-mentioned problems, and provides a switching regulator capable of smooth transition of an operating state from a start-up state to a normal control state, independent of a power supply voltage.

In order to solve the above-mentioned problems, the present invention provides a switching regulator with a soft-start function including: a first oscillation circuit for outputting a start-up switching signal when an output voltage of the switching regulator is lower than a predetermined voltage; a reference voltage circuit for outputting a gradually-increasing reference voltage at start-up of the switching regulator; an operational amplifier for comparing the gradually-increasing reference voltage with a feedback voltage determined based on the output voltage of the switching regulator; a second oscillation circuit for outputting a switching signal; a PWM comparator for comparing an output signal of the operational amplifier with the switching signal; a switch circuit for selectively outputting the start-up switching signal and an output signal of the PWM comparator based on the output voltage of the switching regulator; and a control circuit for controlling the gradually-increasing reference voltage to take a value equal to or higher than a value of the feedback voltage when the output voltage exceeds the predetermined voltage.

According to the switching regulator of the present invention, the smooth transition of the operating state from the start-up state to the normal control state may be made independent of the power supply voltage.

Besides, a soft-start time period is prevented from being excessively long, and hence a device equipped with the switching regulator according to the present invention may have a shortened time period from when a power switch is turned on until the device is enabled.

DETAILED DESCRIPTION OF THE PREFERRED EMBODIMENT

Now, referring to the accompanying drawings, a switching regulator according to an embodiment of the present invention is described below.

Figure 1:
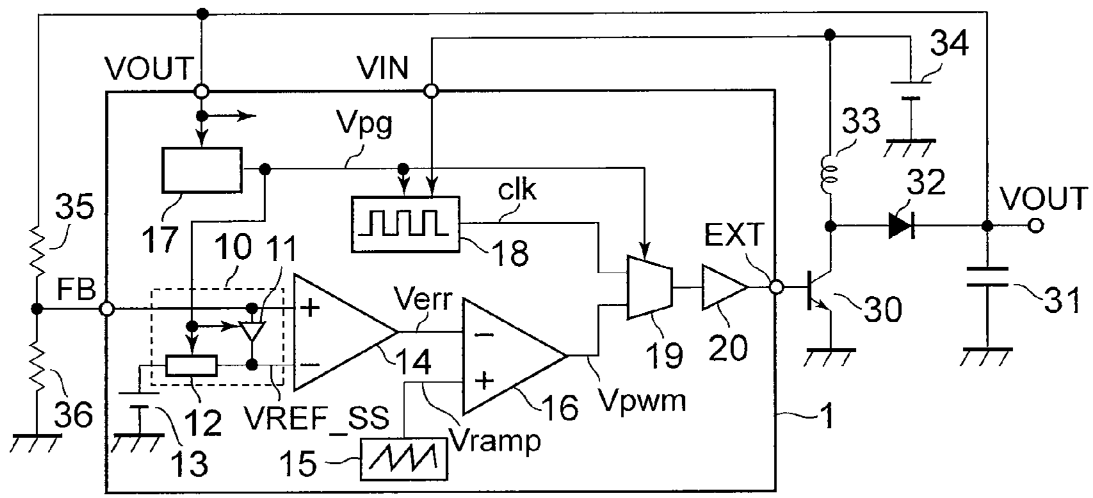
FIG. 1 is a circuit diagram of a switching regulator having a soft-start function according to an embodiment of the present invention.

FIG. 1 illustrates the switching regulator having a soft-start function according to this embodiment.

The switching regulator according to this embodiment includes a switching regulator control circuit 1 and peripheral circuits. A DC voltage source 34 is a power source of the switching regulator control circuit 1 and has a voltage range of from 0.9 V to 1.5 V, assuming a single dry cell as the DC voltage source 34. Between the DC voltage source 34 and GND, a coil 33 and a power transistor 30 are connected. A connection point between the coil 33 and the power transistor 30 is connected to an output terminal VOUT via a diode 32. To the output terminal VOUT, a resistor 35 and a resistor 36, which form a feedback circuit, and an output capacitor 31 are connected. The switching regulator control circuit 1 has a first power supply terminal VIN connected to the DC voltage source 34, a second power supply terminal VOUT connected to the output terminal VOUT, an output terminal EXT connected to a base of the power transistor 30, and a feedback voltage terminal FB connected to an output terminal of the feedback circuit. The feedback circuit may be included in the switching regulator control circuit 1.

The switching regulator control circuit 1 includes an amplifier 11, a soft-start circuit 12, a reference voltage source 13, an operational amplifier 14, a ramp-wave oscillator 15, a PWM comparator 16, a voltage detection circuit 17, a square-wave oscillator 18, a multiplexer circuit 19, and a buffer circuit 20. The amplifier 11 and the soft-start circuit 12 together constitute a soft-start block 10.

A voltage of the first power supply terminal VIN is a power supply voltage of the square-wave oscillator 18. A voltage of the second power supply terminal VOUT is an output voltage of the switching regulator and also serves as a power supply voltage of the circuits other than the square-wave oscillator 18. The feedback voltage terminal FB is connected to an output of the feedback circuit.

The voltage detection circuit 17 monitors the voltage of the second power supply terminal VOUT. A detection signal Vpg of the voltage detection circuit 17 is L when the voltage of the second power supply terminal VOUT is lower than a threshold voltage VTH, and is H when the voltage of the second power supply terminal VOUT is higher than the threshold voltage VTH.

The square-wave oscillator 18 is a start-up oscillation circuit for outputting a square-wave pulse clk serving as a start-up switching signal. The square-wave oscillator 18 outputs the square-wave pulse clk when the detection signal Vpg of the voltage detection circuit 17 is L. The square-wave oscillator 18 causes no problem in boosting operation even if an oscillation frequency fluctuates in a range of from several tens of KHz to several hundreds of KHz due to manufacturing fluctuations, temperature characteristics, or power supply voltage characteristics. Accordingly, the square-wave oscillator 18 may be formed of a circuit capable of operation with a significantly low power supply voltage of 0.9 V.

The operational amplifier 14 compares a voltage of the feedback voltage terminal FB input thereto with a reference voltage VREF_SS output from the soft-start circuit 12, and outputs a voltage Verrout.

The amplifier 11 is connected between input terminals of the operational amplifier 14. The amplifier 11 is an amplifier with a gain of 1 and serves as a control circuit which operates so that the voltages of the input terminals of the operational amplifier 14 become equal to each other when the detection signal Vpg of the voltage detection circuit 17 is L.

The ramp-wave oscillator 15 is an oscillation circuit for outputting a ramp pulse Vramp serving as a switching signal. The ramp pulse Vramp of the ramp-wave oscillator 15 has an oscillation waveform with a constant slope, such as a triangular wave or a sawtooth wave.

The PWM comparator 16 compares the voltage Verrout from the operational amplifier 14 with the ramp pulse Vramp from the ramp-wave oscillator 15, and outputs a signal Vpwm.

The multiplexer circuit 19 is a switch circuit for selecting and outputting any one of the square-wave pulse clk, which is an output signal of the square-wave oscillator 18, and the signal Vpwm from the PWM comparator 16. The multiplexer circuit 19 outputs the square-wave pulse clk when the detection signal Vpg of the voltage detection circuit 17 is L, and outputs the signal Vpwm when the detection signal Vpg thereof is H.

The buffer circuit 20 drives the power transistor 30 as a switching element of the switching regulator, based on a signal output from the multiplexer circuit 19.

Figure 2:
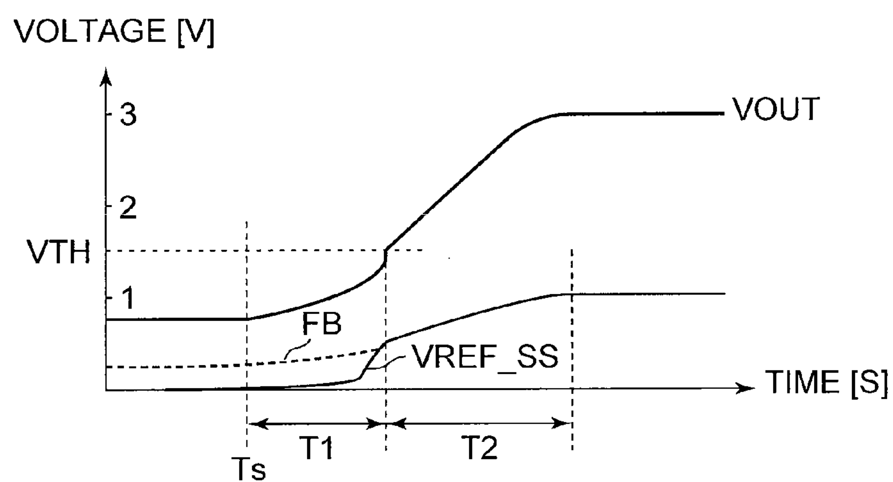
FIG. 2 is a graph illustrating an operation of the switching regulator of FIG. 1.

Referring to the drawings, an operation of the switching regulator having the above-mentioned configuration is described. FIG. 2 is a graph illustrating the operation of the switching regulator of FIG. 1.

Before the switching regulator starts a boosting operation, the power transistor 30 is turned OFF and hence the output terminal VOUT has a voltage determined by subtracting a forward voltage Vf of the diode 32 from the voltage VIN of the DC voltage source 34. When the diode 32 is a Schottky barrier diode, the forward voltage Vf is 0.2 V to 0.3 V. Such a digital circuit as the multiplexer circuit 19 and the buffer circuit 20 is capable of operating even if the voltage VIN is 0.9 V and the voltage of the output terminal VOUT is lower than 0.9 V by 0.2 V to 0.3 V.

First, an operation when the switching regulator starts up at a start-up time Ts is described.

Here, the threshold voltage VTH of the voltage detection circuit 17 is set to 1.5 V. In other words, when the voltage VIN falls within a range of from 0.9 V to 1.5 V, the detection signal Vpg of voltage detection circuit 17 is L. Accordingly, the square-wave oscillator 18 starts its operation to output the square-wave pulse clk. Further, the multiplexer circuit 19 selects the output of the square-wave oscillator 18.

Then, the multiplexer circuit 19 outputs the square-wave pulse clk of the square-wave oscillator 18. In response to the square-wave pulse clk output to the output terminal EXT, the power transistor 30 is driven and the switching regulator starts the boosting operation.

A period when the switching regulator performs the boosting operation with the square-wave pulse clk is referred to as a start-up period T1. In the start-up period T1, the switching regulator according to the present invention does not perform negative feedback control, but performs the boosting operation with the square-wave pulse clk until the output voltage of the output terminal VOUT exceeds the threshold voltage VTH.

At the same time, each of the soft-start circuit 12 and the amplifier 11 constituting the soft-start block 10 starts its operation as well. The amplifier 11 is set to have an operating state so as to output, to the reference voltage VREF_SS, a voltage approximating the feedback voltage FB from the start-up time Ts. However, immediately after the start-up time Ts, the output voltage of the output terminal VOUT is too low to allow the amplifier 11 to operate normally. Accordingly, there is a large potential difference between the reference voltage VREF_SS and the feedback voltage FB.

The operational amplifier 14 is an operational amplifier for performing, when constituting a feedback circuit, feedback control so that a potential difference between an inverting input and a non-inverting input thereof is 0 V. Specifically, the operational amplifier 14 decreases the voltage Verrout when the reference voltage VREF_SS is higher than the feedback voltage FB, and increases the voltage Verrout when the reference voltage VREF_SS is lower than the feedback voltage FB. In other words, if the potential difference between the inverting input and the non-inverting input of the operational amplifier 14 is substantially zero at a time point when the operational amplifier 14 starts the feedback control after entering a soft-start period T2, the feedback control accompanying large fluctuations is not required, to thereby make a stable transition from the start-up period T1 to the soft-start period T2.

Figure 3:
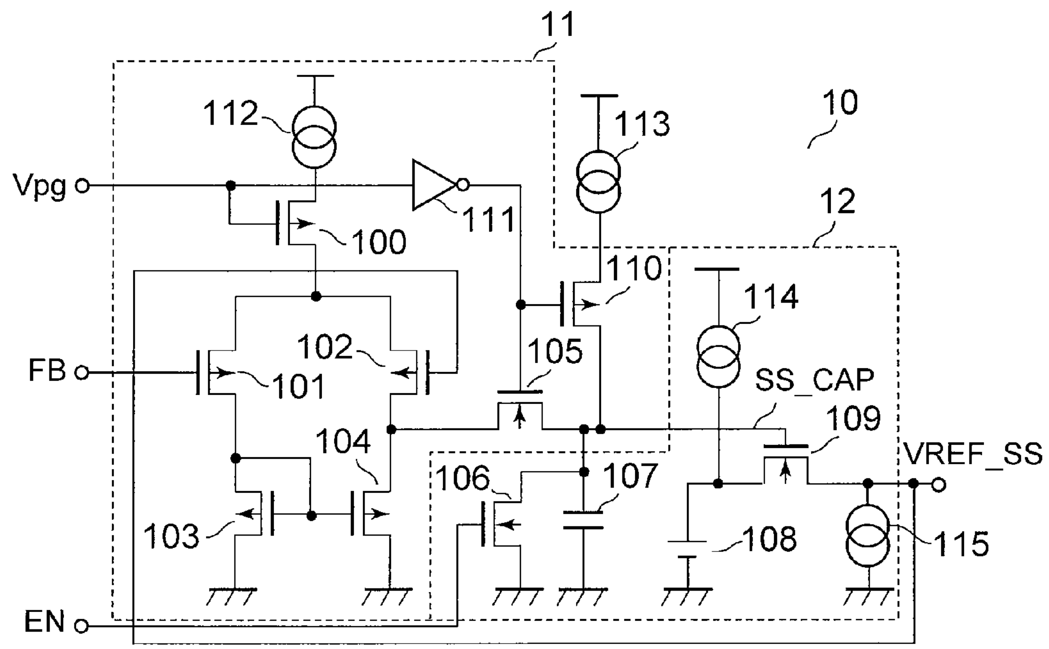
FIG. 3 is a circuit diagram illustrating an example of a soft-start block according to the embodiment of the present invention.
Figure 4:
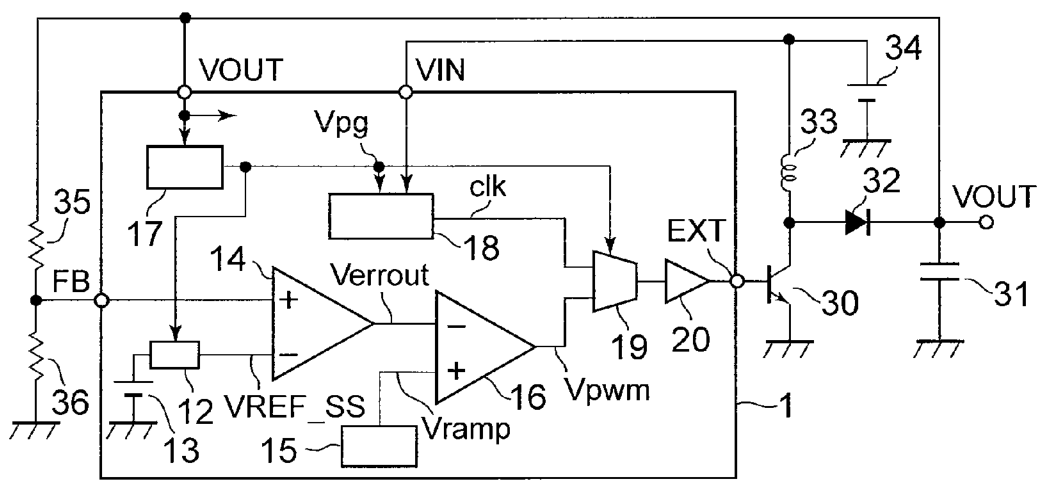
FIG. 4 is a circuit diagram of a conventional switching regulator.
Figure 5:
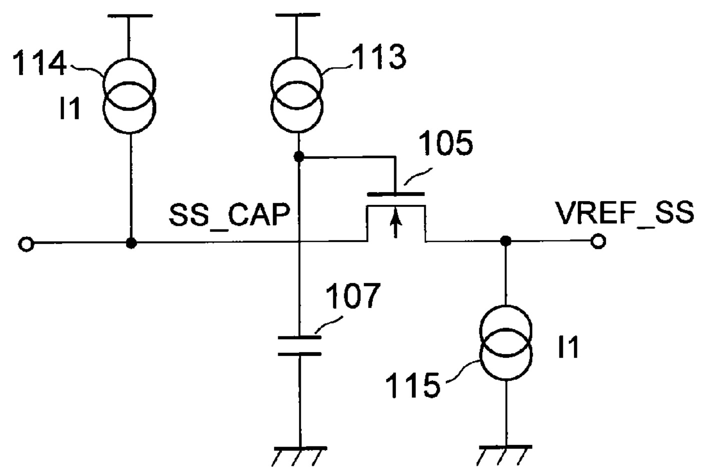
FIG. 5 is a circuit diagram illustrating an example of a conventional soft-start circuit.
Figure 6:
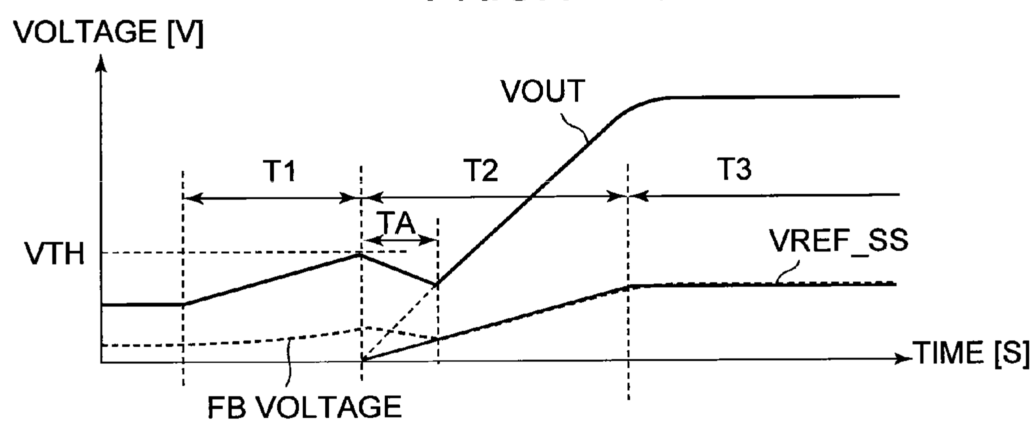
FIG. 6 is a graph illustrating an operation of the switching regulator of FIG. 4.
Figure 7:
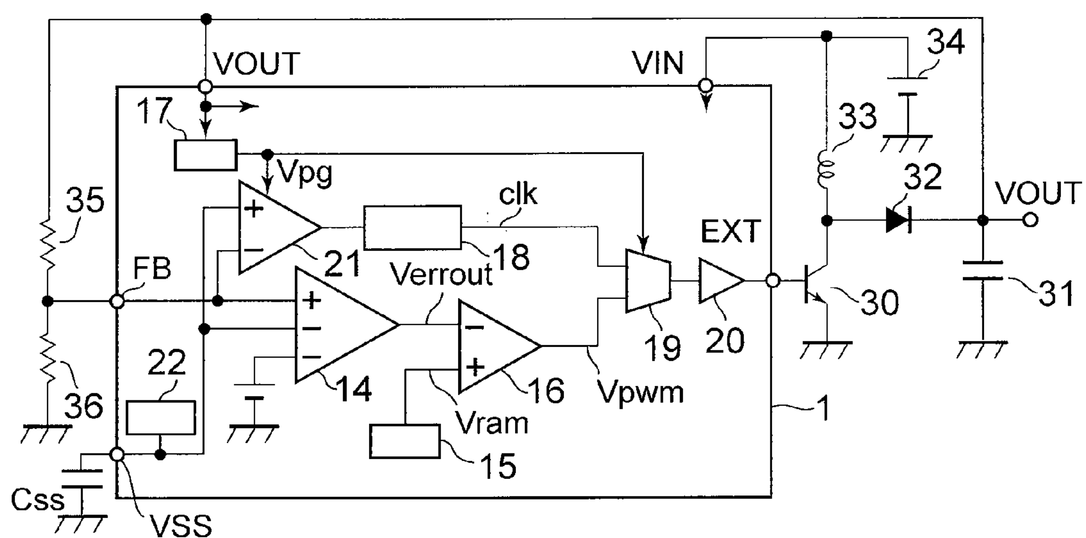
FIG. 7 is a circuit diagram of another conventional switching regulator.
Figure 8:
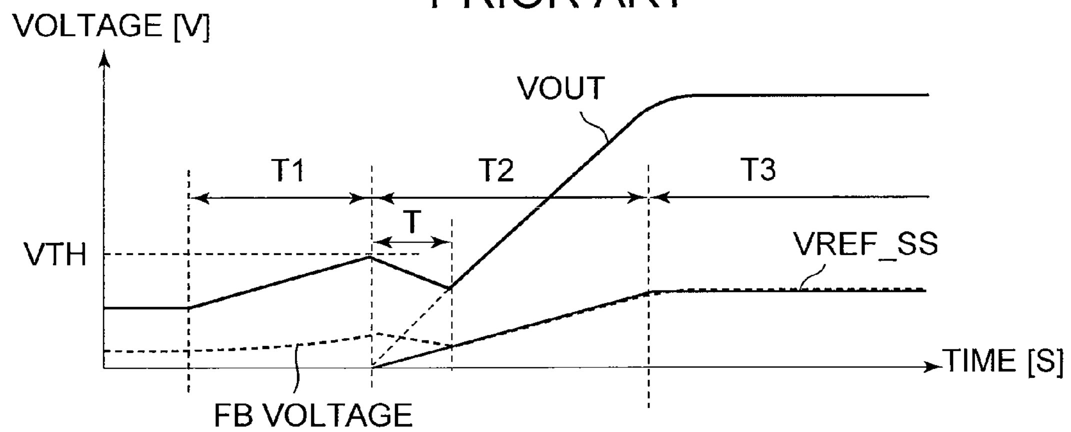
FIG. 8 is a graph illustrating an operation of the switching regulator of FIG. 7.

FIG. 3 is a circuit diagram illustrating an example of the soft-start block 10 according to this embodiment.

The soft-start block 10 includes the amplifier 11 and the soft-start circuit 12. The amplifier 11 includes a differential amplifier circuit, which is formed of transistors 100 to 104 and a constant current source 112, and a switch circuit, which is formed of transistors 105 and 110 and an inverter 111. The soft-start circuit 12 includes constant current sources 113, 114, and 115, a DC voltage source 108, a capacitor 107, and transistors 106 and 109. In the differential amplifier circuit, the feedback voltage FB and the reference voltage VREF_SS as the output of the soft-start circuit 12 are input to the input transistors 101 and 102, respectively. The transistor 100, to which the detection signal Vpg is input, controls the operation and suspension of the differential amplifier circuit. The transistors 110 and 105, to which the detection signal Vpg is input via the inverter 111, switch between an output of the differential amplifier circuit and an output of the constant current source 113, which is then output. When a start-up signal EN is input from a start-up circuit (not shown) to a gate of the transistor 106, the charge/discharge of the capacitor 107 is controlled. The transistor 109 has a gate terminal controlled by a voltage SS_CAP of the capacitor 107.

The soft-start circuit 12 outputs the soft-start reference voltage VREF_SS. The amplifier 11 controls the reference voltage VREF_SS to be substantially equal to the feedback voltage FB when the detection signal Vpg becomes H to switch a boosting state.

The detection signal Vpg is L at the start-up time Ts, and hence the transistor 100 is in a conducting state and the differential amplifier circuit starts its operation. Further, the transistor 105 is in a conducting state while the transistor 110 is in a non-conducting state, and hence an output node of the differential amplifier circuit is connected to the gate of the transistor 109 via the transistor 105. On this occasion, the differential amplifier circuit, the transistor 109, and the constant current sources 114 and 115 together constitute an operational amplifier. In the operational amplifier, a source of the transistor 109 serves as an output, a gate of the transistor 102 serves as an inverting input, and an input of the transistor 101 serves as a non-inverting input. Therefore, the operational amplifier constitutes a voltage follower circuit and outputs a voltage equal to the feedback voltage FB to an output terminal thereof. In other words, the reference voltage VREF_SS becomes equal to the feedback voltage FB.

Through the boosting operation described above, the output voltage of the output terminal VOUT exceeds the threshold voltage VTH of the voltage detection circuit 17, entering the soft-start period T2. When the detection signal Vpg of the voltage detection circuit 17 becomes H, the transistors 100 and 105 become nonconductive so that the differential amplifier circuit suspends its operation. The transistor 110 becomes a conducting state and the constant current source 113 starts charging the capacitor 107. Therefore, the voltage of the node SS_CAP starts increasing gradually. At this time, the constant current sources 114 and 115 continue supplying currents, and hence the transistor 109 operates as a source follower circuit and outputs, as the reference voltage VREF_SS, a voltage which is reduced from the voltage of the node SS_CAP by a voltage Vgs of the transistor 109. Through the above-mentioned operation, the reference voltage VREF_SS reaches to a voltage corresponding to the feedback voltage FB in the start-up period T1, and immediately after entering the soft-start period T2, starts increasing with a form depending on the charge waveform at the node SS_CAP. Because the transistor 109 has a drain connected to the DC voltage source 108, once the reference voltage VREF_SS increases to a voltage VREF of the DC voltage source 108, the reference voltage VREF_SS does not increase any more. Therefore, the voltage VREF is obtained as a stable potential, ending the soft-start period T2.

Then, in the start-up period T1, when the detection signal Vpg becomes H, the square-wave oscillator 18 suspends its operation so that the multiplexer circuit 19 outputs the signal Vpwm. In other words, the switching regulator performs the boosting operation under normal PWM control.

As described above, in the switching regulator according to the present invention, the soft-start reference voltage VREF_SS is equal to the feedback voltage FB at the time of switch from the start-up period T1 to the soft-start period T2. Therefore, a stable transition from the start-up period T1 to the soft-start period T2 is made.

Note that, the description is given above on the configuration of the switching regulator according to the present invention, in which the soft-start reference voltage VREF_SS is equal to the feedback voltage FB at the time of switch from the start-up period T1 to the soft-start period T2. However, another configuration in which the reference voltage VREF_SS becomes higher than the feedback voltage FB at that time may be employed. For example, the amplifier 11 may be set to have a gain of 1 or larger, in other words, the amplifier 11 may be used as a non-inverting amplifier circuit for amplifying the feedback voltage FB at a desired gain. This configuration allows for a margin with respect to performance fluctuations of the amplifier 11, such as an offset voltage, to thereby make a stable transition from the start-up period T1 to the soft-start period T2.

Further, the amplifier 11 may be formed of a source follower circuit in which an input is connected to a feedback voltage VFB and an output is connected to the reference voltage VREF_SS. In general, however, the source follower circuit has a gain of 1 or smaller and outputs a voltage substantially determined by subtracting from an input voltage a threshold voltage of a MOS transistor used in the source follower circuit. Therefore, a gain close to 1 may be obtained if the source follower circuit uses a transistor having a low threshold, such as a depletion type transistor.

What is claimed is:

1. A switching regulator with a soft-start function comprising:

a first oscillation circuit for outputting a start-up switching signal when an output voltage of the switching regulator is lower than a predetermined voltage;

a reference voltage circuit for outputting a gradually-increasing reference voltage at start-up of the switching regulator;

an operational amplifier for comparing the gradually-increasing reference voltage with a feedback voltage determined based on the output voltage of the switching regulator;

a second oscillation circuit for outputting a switching signal;

a PWM comparator for comparing an output signal of the operational amplifier with the switching signal;

a switch circuit for selectively outputting the start-up switching signal and an output signal of the PWM comparator based on the output voltage of the switching regulator; and a control circuit for controlling the gradually-increasing reference voltage, wherein the gradually-increasing reference voltage follows and matches a voltage across a capacitive element, wherein when the output voltage is below the predetermined threshold, the control circuit controls the voltage across the capacitive element to follow and match the feedback voltage, and when the output voltage exceeds the predetermined voltage, the control circuit controls the capacitive element to charge based on current sourced from a constant current source circuit.

2. A switching regulator according to claim 1, wherein the control circuit comprises an amplifier with a gain of 1, which is connected between input terminals of the operational amplifier.

3. A switching regulator according to claim 1, wherein the control circuit comprises a source follower circuit.

4. A switching regulator according to claim 3, wherein the source follower circuit comprises a depletion type transistor.

5. A switching regulator according to claim 1, wherein the control circuit comprises an amplifier circuit including the operational amplifier.

6. A switching regulator according to claim 1, wherein the control circuit uses the output voltage of the switching regulator as power supply to the control circuit.

7. A switching regulator according to claim 6, wherein the control circuit suspends its operation when the output voltage of the switching regulator is equal to or higher than the predetermined voltage.

* * * * *